United States Patent
Wu

(10) Patent No.: US 8,159,344 B2
(45) Date of Patent: Apr. 17, 2012

(54) MICROWAVE MOTION DETECTORS UTILIZING MULTI-FREQUENCY RANGING AND TARGET ANGLE DETECTION

(75) Inventor: XiaoDong Wu, Roseville, CA (US)

(73) Assignee: Honeywell International, Inc., Morristown, NJ (US)

( * ) Notice: Subject to any disclaimer, the term of this patent is extended or adjusted under 35 U.S.C. 154(b) by 778 days.

(21) Appl. No.: 12/259,670

(22) Filed: Oct. 28, 2008

(65) Prior Publication Data
US 2010/0103020 A1    Apr. 29, 2010

(51) Int. Cl.
G08B 13/18    (2006.01)
G08B 13/00    (2006.01)
G01S 13/08    (2006.01)

(52) U.S. Cl. ........ 340/552; 340/554; 340/435; 340/438; 340/541; 340/545.5; 342/127; 342/129

(58) Field of Classification Search .............. None
See application file for complete search history.

(56) References Cited

U.S. PATENT DOCUMENTS

| | | | |
|---|---|---|---|
| 5,786,760 A | 7/1998 | Suzuki et al. | |
| 5,923,284 A | 7/1999 | Artis et al. | |
| 5,977,906 A * | 11/1999 | Ameen et al. | 342/174 |
| 6,307,475 B1 | 10/2001 | Kelley | |
| 6,380,882 B1 | 4/2002 | Hegnauer | |
| 6,677,887 B2 | 1/2004 | Harman | |
| 6,680,691 B2 * | 1/2004 | Hager et al. | 342/127 |
| 6,703,967 B1 | 3/2004 | Kuroda et al. | |
| 7,079,029 B2 | 7/2006 | Tsuji | |
| 7,079,030 B2 | 7/2006 | Tsuji | |
| 7,084,761 B2 | 8/2006 | Izumi et al. | |
| 7,119,737 B2 | 10/2006 | Tsuji | |
| 7,633,426 B2 * | 12/2009 | Sutphin | 342/22 |
| 7,982,606 B2 * | 7/2011 | Wu et al. | 340/554 |
| 2006/0181449 A1 * | 8/2006 | Aker | 342/104 |
| 2006/0284757 A1 | 12/2006 | Zemany | |
| 2010/0328068 A1 * | 12/2010 | Schreiner | 340/554 |

FOREIGN PATENT DOCUMENTS

| | | |
|---|---|---|
| EP | 0933648 A1 | 8/1999 |
| EP | 2042886 A2 | 4/2009 |
| JP | 59116073 | 4/1984 |

OTHER PUBLICATIONS

Partial EPO Search Report, EP09165104.2, Feb. 8, 2010.

* cited by examiner

*Primary Examiner* — Julie Lieu
(74) *Attorney, Agent, or Firm* — Barkume & Associates, P.C.

(57) ABSTRACT

A method of detecting a moving target within a predefined protected region with a microwave motion detector, by transmitting microwave frequency signals and receiving the microwave frequency signals reflected by a target. A target distance is then determined from the received microwave frequency signals, and a target angle is determined from the received microwave frequency signals. Then, a target location is determined from the target distance and the target angle, and an alarm condition is set if the target location is within the predefined protected region.

10 Claims, 10 Drawing Sheets

MICROWAVE MOTION DETECTORS UTILIZING MULTI-FREQUENCY RANGING AND TARGET ANGLE DETECTION

CROSS-REFERENCE TO RELATED APPLICATIONS

This application is related to copending application Ser. No. 12/174,807 filed on Jul. 17, 2008 entitled MICROWAVE RANGING SENSOR; copending application Ser. No. 12/198,942 filed on Aug. 27, 2008 entitled RELIABLE SECURITY SYSTEM BY TRIANGULATION; and Ser. No. 12/237,080 filed on Sep. 24, 2008 entitled MICROWAVE MOTION DETECTOR WITH TARGET ANGLE DETECTION; all of which are assigned to the assignee of the present application.

TECHNICAL FIELD

The present invention relates to security systems, and in particular to microwave frequency motion detectors used for monitoring a protected space.

BACKGROUND ART

It is desired in the security field to more accurately determine if an intruder has entered a protected space. A common method of accomplishing this is to use dual technology motion detectors consisting of a Doppler microwave frequency motion detector and a passive infrared (PIR) detector. The PIR detector senses infrared radiation (IR) from the intruder while the Doppler microwave frequency motion detector transmits a microwave frequency signal and detects a change in the return signal due to the presence of an intruder. However, the PIR has inherent weaknesses that prevent it from detecting an intruder when the intruder moves directly at the sensor, when the ambient temperature is high, or when the intruder is cloaked, while the microwave frequency motion detector's inherent weakness is that false alarms occur when the detected motion is from a person outside the protected space or from a vibration of an object within the protected space. The typical operation of a dual technology motion detector is that the detector will generate an alarm signal when the PIR detector and the microwave frequency motion detector both detect the intruder. The combination of the detectors eliminates false alarms due to the microwave frequency motion detector detecting motion from a person outside the protected space or from vibration of an object within the protected space, but does not eliminate the inherent weakness of the PIR detector. It is desirable to use a microwave frequency motion detector, which detects all motion from an intruder, without the PIR detector and without false alarms. One way to reduce the false alarms associated with a microwave motion detector without the PIR detector confirmation is to accurately determine the location and movement of the intruder inside and outside the protected space in addition to detecting the intruder's motion. This allows vibrations, which over time do not change location, to be discriminated against. Additionally, if the microwave frequency motion detector also knows the perimeter of the protected space, it can discriminate against detected motion that is outside the perimeter of the protected space.

Furthermore, since the microwave frequency motion detector has a wider field of view than a PIR, it can provide wider coverage to odd shaped rooms and can detect motion outside a wall. Being able to detect motion inside the protected space and outside the protected space allows the detector to generate a warning when an intruder is moving towards the protected space but has not yet intruded, or generate an alarm when the intruder has transitioned from outside the protected space to inside the protected space. Detecting a transition from outside the protected space to inside the protected space allows a user to remain in the protected space without generating false alarms and while continuing intrusion protection of the protected space by the motion detector. This "nighttime" mode (where user turns the alarm system on while present in the protected space) is typically accomplished by use of magnetic door sensors. It is desirable to use one microwave frequency motion detector for all modes.

It is therefore an object of the present invention to be able to provide a reliable microwave motion detector that does not need to operate in conjunction with PIR devices as in dual technology devices of the prior art.

It is also an object of the present invention to be able to provide a reliable microwave motion detector that can differentiate motion outside the protected space from motion within the protected space.

DISCLOSURE OF THE INVENTION

The present invention is a method of detecting a moving target within a predefined protected region with a microwave motion detector, by transmitting microwave frequency signals and receiving the microwave frequency signals reflected by a target. A target distance and a target angle is determined from the received microwave frequency signals. Then, a target location is determined from the target distance and the target angle, and an alarm condition is set if the target location is within the predefined protected region.

To determine the target angle, the microwave motion detector may receive the microwave frequency signals reflected by a target with each of two receiving antennas, wherein each receiving antenna provides a received signal in each of two separate channels. Then, the microwave detector determines, from the received microwave frequency signals, a target angle from a phase difference between each received microwave frequency signals in the separate channels. This determination may be made by summing and mixing, with a portion of the transmitted microwave frequency signals, the two channels of received reflected signals to generate sum pattern signals; subtracting and mixing, with a portion of the transmitted microwave frequency signals, the two channels of received reflected signals to generate difference pattern signals; and determining the target angle from the ratio of the sum pattern signals and the difference pattern signals.

To determine the target distance, the microwave motion detector may transmit a plurality of microwave frequency signals at different frequencies. Then, the microwave detector determines, from the received microwave frequency signals, a target distance by generating from the received microwave signals intermediate frequency signal components, wherein each intermediate frequency signal component is representative of one of the received reflected microwave signals; sampling the intermediate frequency signal components; determining phase angles from the sampled intermediate frequency signal components; determining a phase difference between the phase angles; and determining, from the phase difference, a corresponding target distance measurement.

To determine the target distance without ambiguity, three or more microwave frequency signals may be transmitted at different frequencies. In particular, the step of determining phase angles from the sampled intermediate frequency signal components comprises determining a first, second, and third phase angle from the sampled intermediate frequency signal components; the step of determining a phase difference between the phase angles comprises determining a first phase difference between the second phase angle and the first phase angle, and determining a second phase difference between the third phase angle and the first phase angle; and the step of determining, from the phase difference, a corresponding target distance measurement comprises: for each of the first and second phase differences, determining two corresponding distance measurements, wherein one distance measurement is a true distance measurement and the other distance measurement is an ambiguous distance measurement, and selecting an accurate distance measurement by matching the common true distance measurement of each phase difference.

The intermediate frequency signal components may be multiplexed on a single intermediate frequency signal, and the step of sampling of the intermediate frequency signal components may be by collecting data samples of the intermediate frequency signal that corresponds to each of the three transmitted microwave frequency signals. This may be accomplished by enabling one of three data channels by selecting a switch to provide the intermediate frequency signal to the selected data channel, wherein the selected data channel corresponds to one of the three transmitted microwave frequency signals; sampling and holding the intermediate frequency signal; amplifying the selected intermediate frequency sample; converting to digital format the amplified intermediate frequency sample; and storing the digital intermediate frequency sample. This collecting of data samples may be repeated for a predetermined number of times to form three intermediate frequency data sets.

A determination of whether the target is to the left or right of the detector may be made using the phase information from the sum pattern signal and the difference pattern signal.

The location of the target may be detected for a plurality of location samples as described above. The plurality of location samples are then analyzed to determine if the target has transitioned from a first region to a second region. If the target has transitioned from a first region to a second region, then a predetermined action is initiated, which may be a transmission of an alarm message to an associated control panel or the like.

Similarly, a warning condition may be set if the target location is not within the predefined protected region.

BEST MODE FOR CARRYING OUT THE INVENTION

Figure 1:
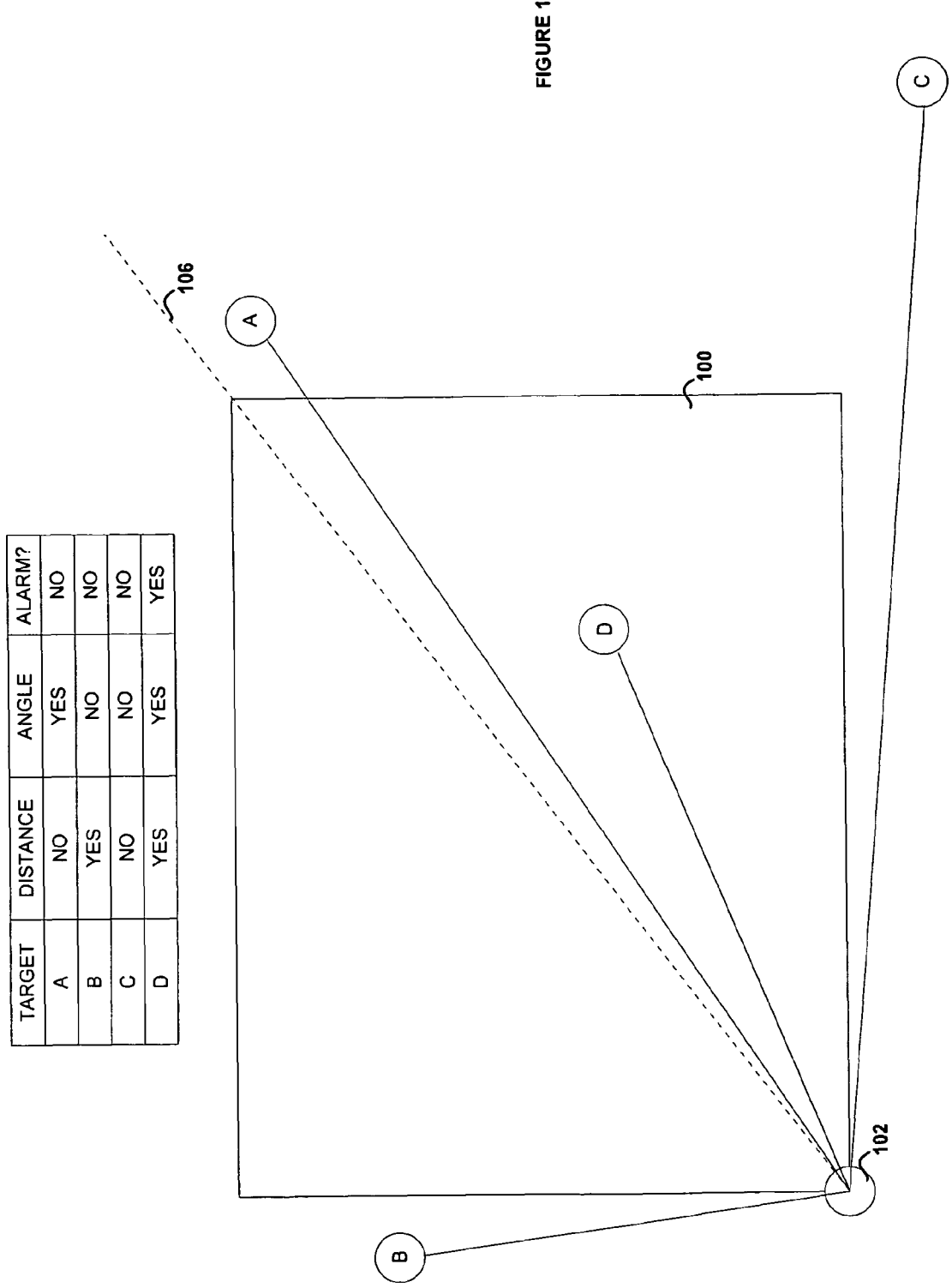
FIG. 1 is an illustration of the coverage of a typical room for the preferred embodiment of the present invention.

In FIG. 1, a room 100 is shown as a predefined protected region of the microwave motion detector 102 of the present invention. Detector 102 is shown mounted in one corner but may be located in other places if desired. The microwave motion detector is capable of detecting motion by a target within the perimeter of the room 100 as well as outside of the room 100 since it typically will have a field of view greater than 90 degrees.

As will be explained in detail below, the detector 102 of the present invention measures the angle of the target with respect to normal as well as the distance to the target, and uses this information to determine the location of the target. If the moving target is inside the predefined protected region (e.g. the room 100) then it will send an alarm message to an associated control panel as known in the art. If however, the moving target is outside the predefined protected region, then it will not send an alarm message to the control panel. Optionally, depending on the location and/or relative movement of the target, the detector may send a warning message to the control panel, as will be discussed further below.

Four different potential moving targets A, B, C and D are used to illustrate the invention. In the case of target A, the target angle is inside the 90 degree field of view defined by the room 100, but the target distance is too far. As such the detector will determine that target A is outside the protected region (the room 100). Thus, as shown in the truth table of FIG. 1, no alarm message is sent. In the case of target B the target distance is within range of the protected region, but the target angle is outside the 90 degree field of view. As such the detector will determine that target B is outside the protected region. Thus, as shown in the truth table of FIG. 1, no alarm message is sent. In the case of target C, the target distance is too far, and the target angle is outside the 90 degree field of view. As such the detector will determine that target C is outside the protected region. Thus, as shown in the truth table of FIG. 1, no alarm message is sent. In the case of target D, the target distance is within the protected region, and the target angle is within the 90 degree field of view. As such the detector will determine that target D is inside the protected region. Thus, as shown in the truth table of FIG. 1, an alarm message is sent to the control panel.

The detector 102 can determine the location of the moving target in accordance with well known mathematical principles after it determines the target angle and the target distance. In addition, the detector will have stored in its memory data indicative of the perimeter measurements of the room or other area under surveillance, which will be explained further below. Thus, by determining the target angle and the target distance, and then comparing that data to previously stored perimeter data, the detector will determine if the target is within the predefined protected region and whether to send an alarm message.

Figure 2:
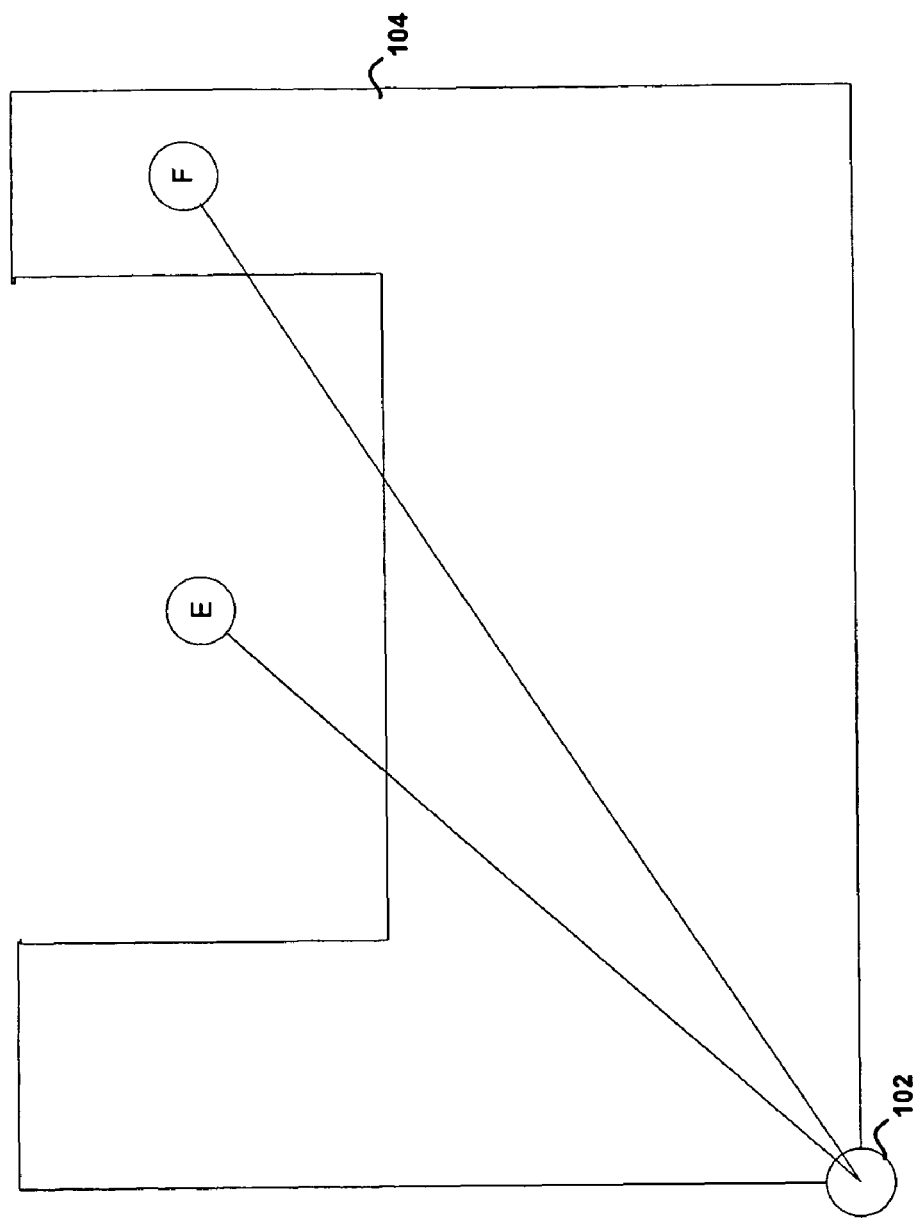
FIG. 2 is an illustration of the coverage of an atypical room for the preferred embodiment of the present invention.

The present invention is especially useful in situations wherein the protected region is an irregularly shaped room, such as shown in FIG. 2. Here, target E is determined to be outside of the protected region 104 and target F is determined to be within the protected region 104. As with the examples of FIG. 1, the detector will use the measured target angle and target distance to determine the target location, and then refer to previously stored data indicative of the layout of the protected region to ascertain if an alarm message should be sent.

Figure 3:
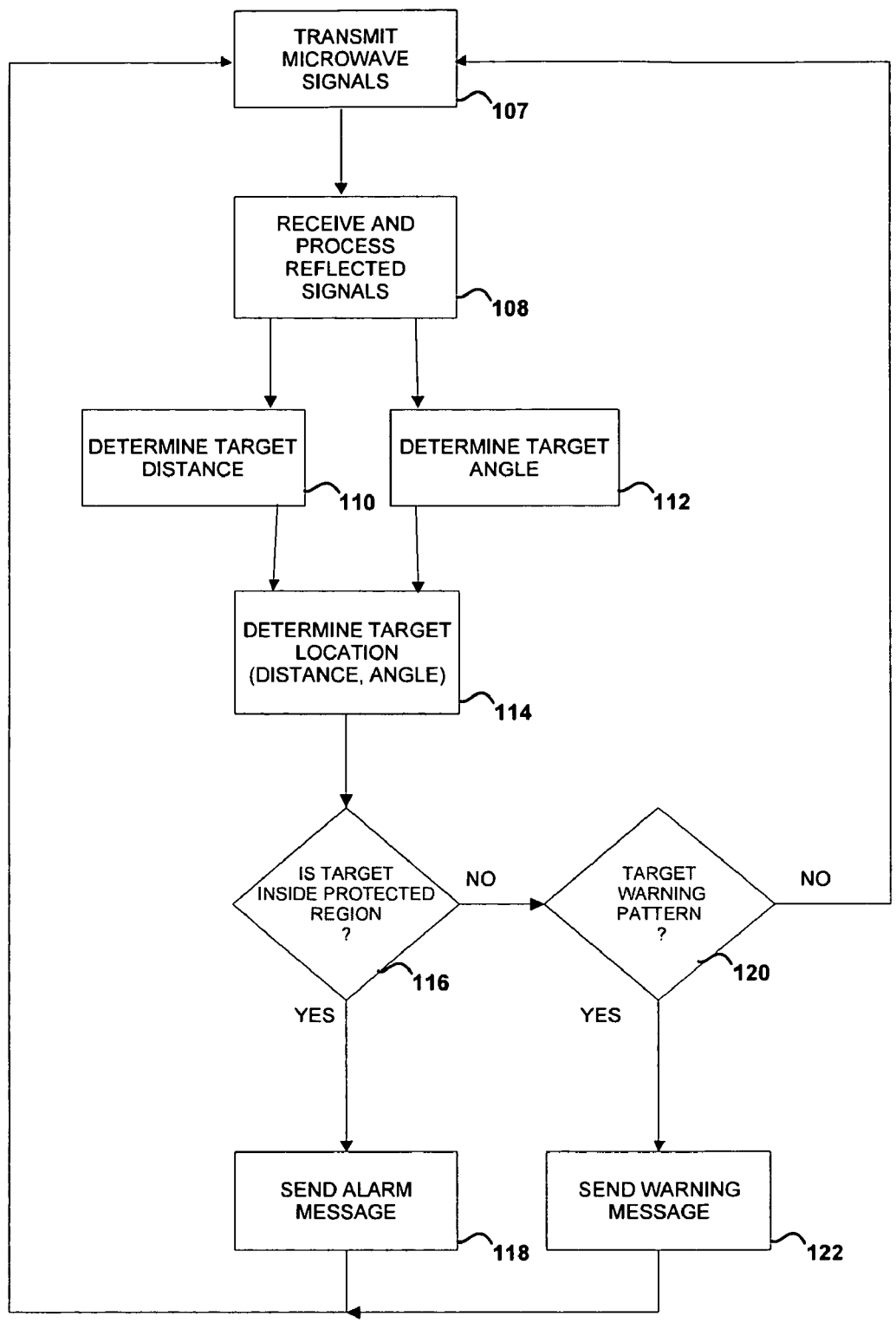
FIG. 3 is a flowchart of the operation of the preferred embodiment of the present invention.

The flowchart of FIG. 3 illustrates this methodology. Microwave signals are transmitted at step 107, and signals reflected from a moving target are received and processed at step 108. The distance to the target is determined at step 110, and the target angle is determined at step 112. The order of operation of these two processes is unimportant, and in fact the processing may be intermixed based on the circuitry implemented as explained below. Once the distance and angles are determined, then the target location is determined as a function of the distance and angle at step 114. If the target is determined to be inside the protected region (step 116), then an alarm message is sent at step 118. If, however, the target is not determined to be inside the protected region, then an alarm message is not sent. The location of the moving target and/or its trajectory (as determined by multiple location measurement iterations, for example), may cause a warning message to be sent (steps 120, 122). This may occur, for example, if a moving target is rapidly approaching the protected region.

In the preferred embodiment, the determination of the target angle is achieved with reference to the Applicant's copending U.S. patent application Ser. No. 12/237,080 filed on Sep. 24, 2008 entitled MICROWAVE MOTION DETECTOR WITH TARGET ANGLE DETECTION, the specification of which is incorporated by reference herein. The principles of that invention are applied herein as will be explained below. In addition, the determination of the target distance is achieved with reference to the Applicant's copending U.S. patent application Ser. No. 12/174,807 filed on Jul. 17, 2008 entitled MICROWAVE RANGING SENSOR, the specification of which is incorporated by reference herein. The principles of that invention are applied herein as also will be explained below. The preferred embodiment present invention uses both of these inventions to determine the target location and then ascertain if an alarm message should be sent based on the target location with respect to the layout of the protected region.

Target Angle Detection

Figure 4:
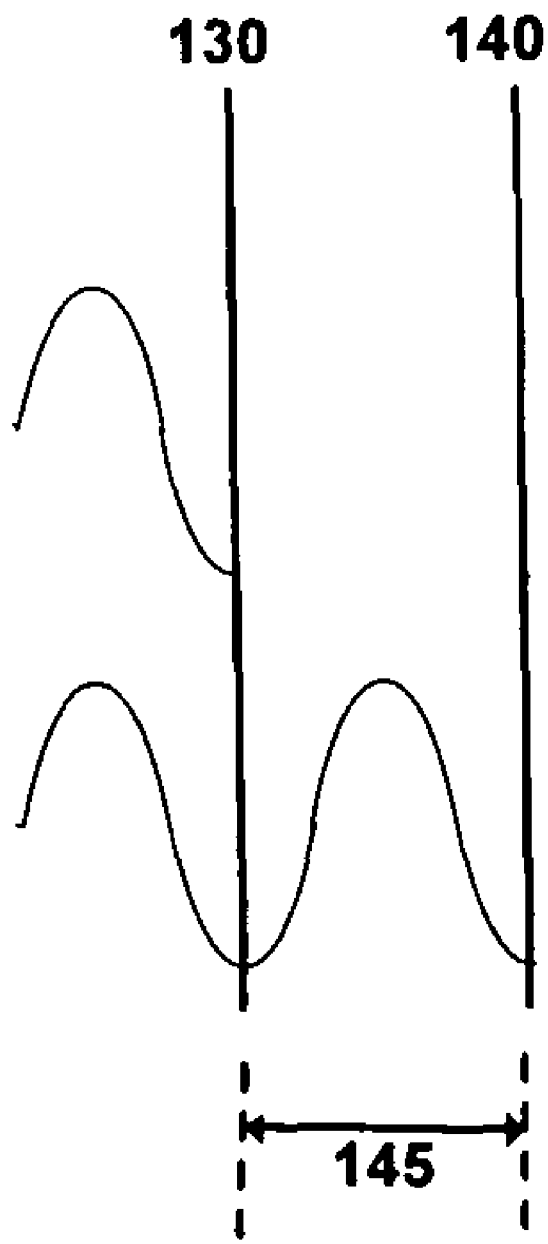
FIG. 4 illustrates the parallel microwave detector antennas/receivers in the preferred embodiment of the present invention.

The preferred embodiment of the present invention may measure the target angle of the moving target as will now be explained. In the microwave motion detector of the present invention, there are two microwave antennas/receivers 130 and 140, which are separated by a known distance 145, and which are substantially parallel as shown in FIG. 4. The known distance 145 is less than one wavelength of the transmitted microwave signal. The known distance 145 is typically approximately 0.7 times the wavelength of the transmitted microwave signal in order to avoid phase angle ambiguity. When a target is in a direct line of sight 106 of the detector 102 (as shown in FIG. 1), the antennas/receivers 130 and 140 receive the reflected transmitted microwave signal identically. However, when the target is not in the direct line of sight 106 of detector 102, the antennas/receivers 130 and 140 receive the reflected transmitted microwave signals with a phase difference, as shown in FIG. 4. The difference in the phase between the signals received by the antennas/receivers 130 and 140 corresponds to the angle shift of the target from the direct line of sight 106 of the detector 102. Thus, the processing circuitry of the detector 102 can determine the target angle with respect to the direct line of sight 106. That is, the target angle is dependent on the two receiver antenna patterns and the distance between them. In order to accurately determine the phase difference between the signals received by the antennas/receivers 130 and 140, the two signals are added and subtracted and the ratio of the added and subtracted signals (the target ratio) is a precise indication of the phase difference.

Figure 6:
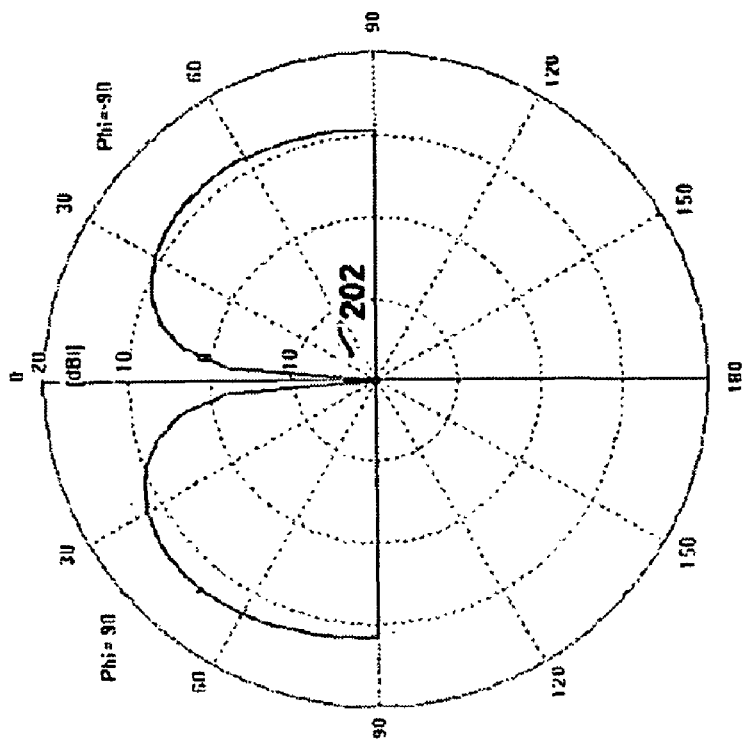
FIG. 6 illustrates the difference pattern of the signals from the two receivers that correspond to each target angle in the preferred embodiment of the present invention.
Figure 5:
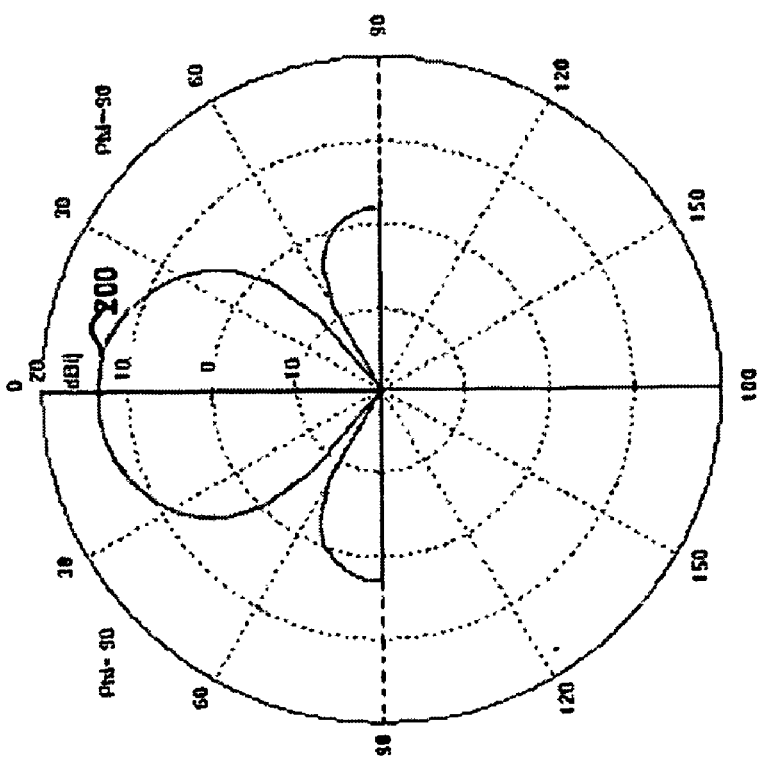
FIG. 5 illustrates the sum pattern of the signals from the two receivers that correspond to each target angle in the preferred embodiment of the present invention.

FIG. 5 shows the sum-pattern and FIG. 6 shows the difference-pattern of the two signals from the microwave antennas/receivers 130 and 140. When a target is in a direct line of sight 106 of the microwave antennas/receivers 130 and 140 (i.e. there is no phase difference) the sum-pattern has a maximum signal strength 200 and the difference-pattern has a minimum signal strength 202. The target ratio is the highest when a target is in a direct line of sight 106. As the target moves away from the direct line of sight 106, the difference-pattern rapidly increases causing the target ratio to become smaller. As shown in FIGS. 5 and 6, if the signal amplitude of sum-pattern and the signal amplitude of difference-pattern are equal, then the angle for the target is about 28 degrees. The processor circuitry determines the target angle from the target ratio, which may be accomplished by a simple look up table.

Figure 7:
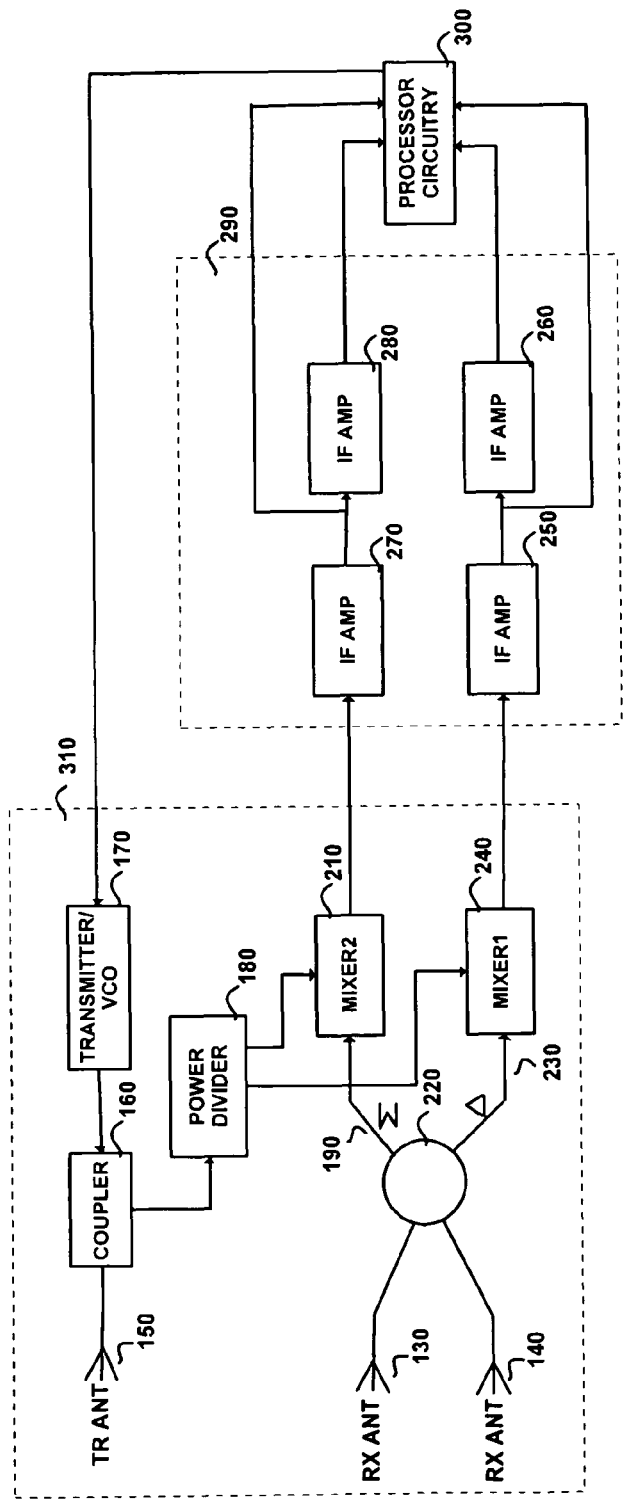
FIG. 7 is a block diagram of a microwave detector circuit of the present invention utilizing a single frequency signal for determining the target angle.

FIG. 7 is a diagram of the circuitry used for target angle detection, which includes the microwave frequency sensor 310, the amplifier circuits 290, and the processor circuitry 300. Processor circuitry 300 initiates the transmitter 170 to transmit the microwave frequency signals from the transmitting antenna 150. The transmitted microwave frequency signals are reflected from a moving target, and then received by each of the two receiving antennas 130 and 140, with each receiving antenna 130, 140 providing a received signal in each of two separate channels. The microwave signals from the moving target are summed to generate a sum signal 190 and subtracted to generate a difference signal 230 by microwave circuits 220, which are known in the art. The conversion of the summed microwave signal 190 and the difference microwave signal 230 to intermediate frequency (IF) signals is performed by mixer circuits 210 and 240. In an alternative design, the summing 190 and the subtracting 230 may take place after the conversion of the reflected microwave signals to IF signals rather than before. In either case, in order to generate the IF signal, the mixers circuits 210 and 240 receive a portion of the transmitted microwave signal from coupler 160 which is divided down by power divider circuit 180. These circuits are all well known in the art. Each IF signal may be amplified by two stages of amplifiers 270 and 280, and 250 and 260 respectively, and the outputs from each amplifier 270, 280, 250, 260 are transmitted to the processor circuitry 300. The processor circuitry 300 determines which signals to process, if the signals exceed an alarm threshold level, and what the target angle is from the signals. As will be described below, in the preferred embodiment of the present invention each IF signal is connected to circuitry for determining the target distance rather than the amplifier circuitry 290.

Target Distance Detection

Figure 8:
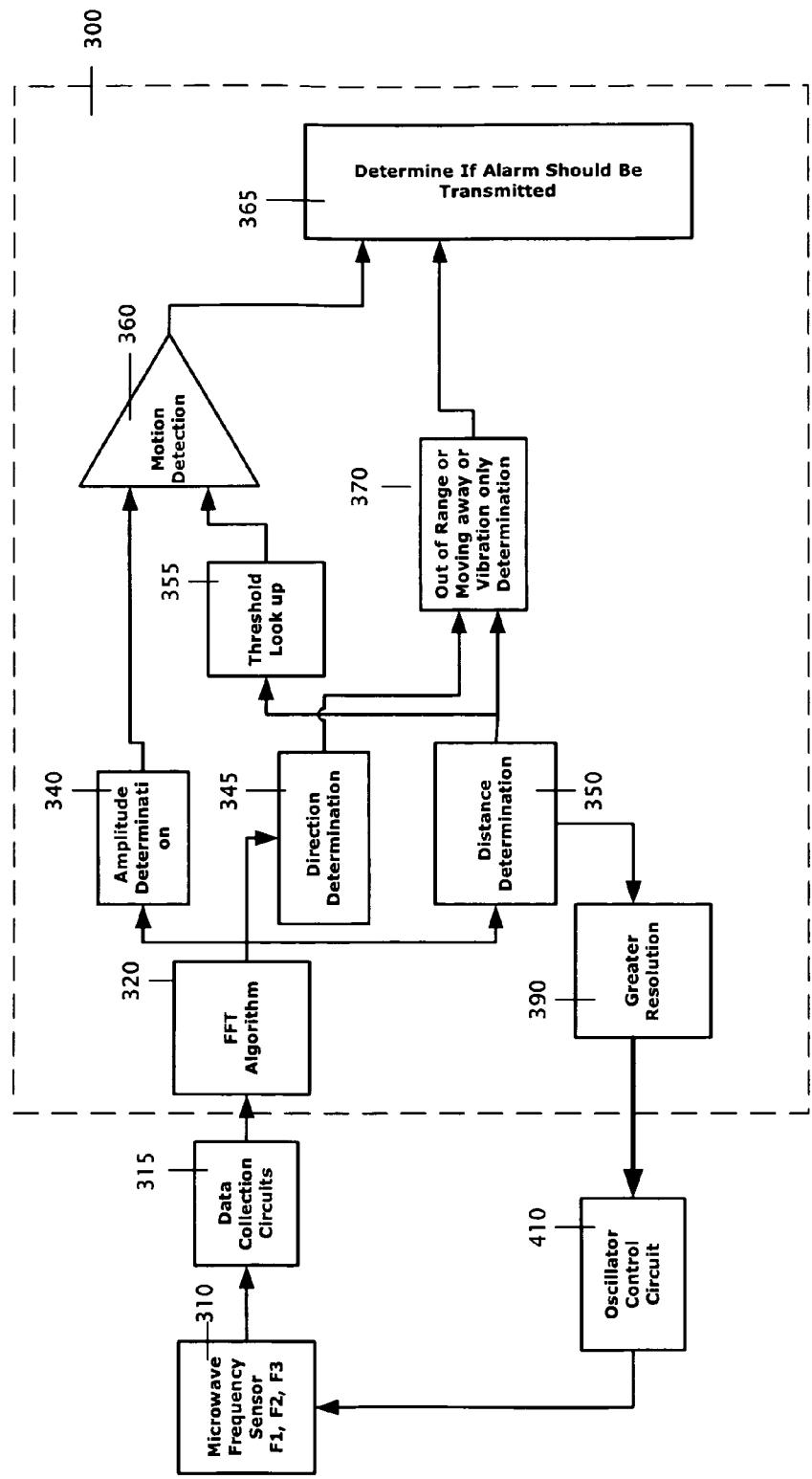
FIG. 8 is a block diagram of a microwave detector circuit of the present invention that utilizes three frequencies for determining the target distance.

Determining the distance from the detector 102 to the moving target may be determined in a number of ways known in the art, such as FMCW, ultra wideband, and ultrasonic ranging techniques. The microwave motion detector of the '807 application is the preferred embodiment because it is useful in determining the distance from the detector 102 to the moving target and whether the target is to the left or right of the detector 102 (which will be described below). The preferred embodiment will now be described with respect to FIG. 8. In this embodiment, the components of the microwave motion detector 102 are the microwave sensor 310, the data collection circuits 315, the oscillator control circuit 410, and the processor circuitry 300. The oscillator control circuit 410, further described below, causes the microwave sensor 310 to transmit three microwave signals (F1, F2, and F3) that differ only slightly so that F2=F1+Δ1 and F3=F1+Δ2, where Δ1<<F1 and Δ2<<F1. In the preferred embodiment, the frequencies of the transmitted microwave signals are initially set to cover the maximum distance (minimum frequency difference such as few MHz). The microwave sensor contains a microwave receiver that receives reflected microwave signals from an object in the protected region. The received signals are sampled by the data collection circuits 315, as described below. After the received signals are sampled, the samples are collected by the processor circuitry 300.

The processing by the processor circuitry 300 will now be described. The processor circuitry 300 sequentially collects the data samples into three data sets of the IF signal samples where the data sets correspond to each of the three microwave signals (F1, F2, and F3). Each data set is processed using an FFT algorithm 320 to determine the signal amplitude and phase angle (ø1, ø2, ø3) of the received reflected Doppler signals as known in the art. First the distance to the object is determined 350 by finding two phase differences, Δø1 and Δø2, by subtracting the phase angles, ø1−ø2 and ø1−ø3, respectively. For each phase difference, two distances are determined, R and R', where one is a true distance measurement and the other is an ambiguous distance measurement. The ambiguous distance measurement is due to the phase advance/delay uncertainty between the received Doppler signals. The two distances are determined using the equations:

$$R = c|\Delta\emptyset|/4\pi\Delta f$$

and $$R' = c|2\pi - \Delta\emptyset|/4\pi\Delta f,$$

where R and R' are the distances to the moving object in meters from the microwave sensor, c is the speed of light in meters per second, Δf is F2−F1 or F3−F1 in Hz, and |Δø| is the absolute value of Δø1 or Δø2 respectively in radians. To determine the accurate distance measurement, the four distances are compared. The two that are different are the ambiguous distance measurements, while the two true distance measurements that are approximately the same and are selected as the accurate distance measurement.

The accurate distance measurement is used in a number of ways. The direction of travel is determined 345 from the sign (±) of Δø1 or Δø2 by time gated the phase difference. The + sign indicates an approaching target while the − sign indicates a leaving target. Next, if the accurate distance is approximately at the maximum distance of the protected space and the direction of travel 345 is away from the detector, the processor circuitry 300 determines the motion is moving away 370. In addition, the accurate distance measurement is used to check for vibration of an object rather than motion by an intruder. These conditions will cause the processor circuitry 300 not to transmit an alarm.

If the distance measurement is less than the maximum range of the microwave sensor 310, the processor circuitry 300 can perform another iteration of data collection with greater resolution 390 (option). In order to achieve greater resolution 390, a new F2 and F3 are selected based on the accurate distance measurement. This is accomplished in the present invention by holding F1 constant and selecting a new F2 and F3 so that Δf at least covers the accurate distance measurement. F2 and F3 are selected close to F=F1+c/2R", R" is the previous detected distance. The resolution is greater because the maximum unambiguity distance is reduced while the phase measurement error for the system is the same. Multiple ambiguities do not arise at this point because the distance is already known (although with less resolution).

Once the best resolution has been achieved at that distance, the accurate distance measurement is used as a pointer to a threshold level in a threshold look up table 355 stored in memory. The threshold levels are programmed during manufacture and have been selected based on empirical test results. The thresholds are selected so that signal amplitudes from humans at each accurate distance measurement will be above the threshold while signal amplitudes that are not from humans will not be above the threshold. For example, the thresholds can be set up for every few feet. Once the threshold 355 is determined, the amplitude is determined 340 by finding an average of the three signal amplitudes, or alternatively from selecting the highest signal amplitude. The amplitude is compared to the threshold signal level and if the amplitude is greater, then motion has been detected 360.

Figure 9:
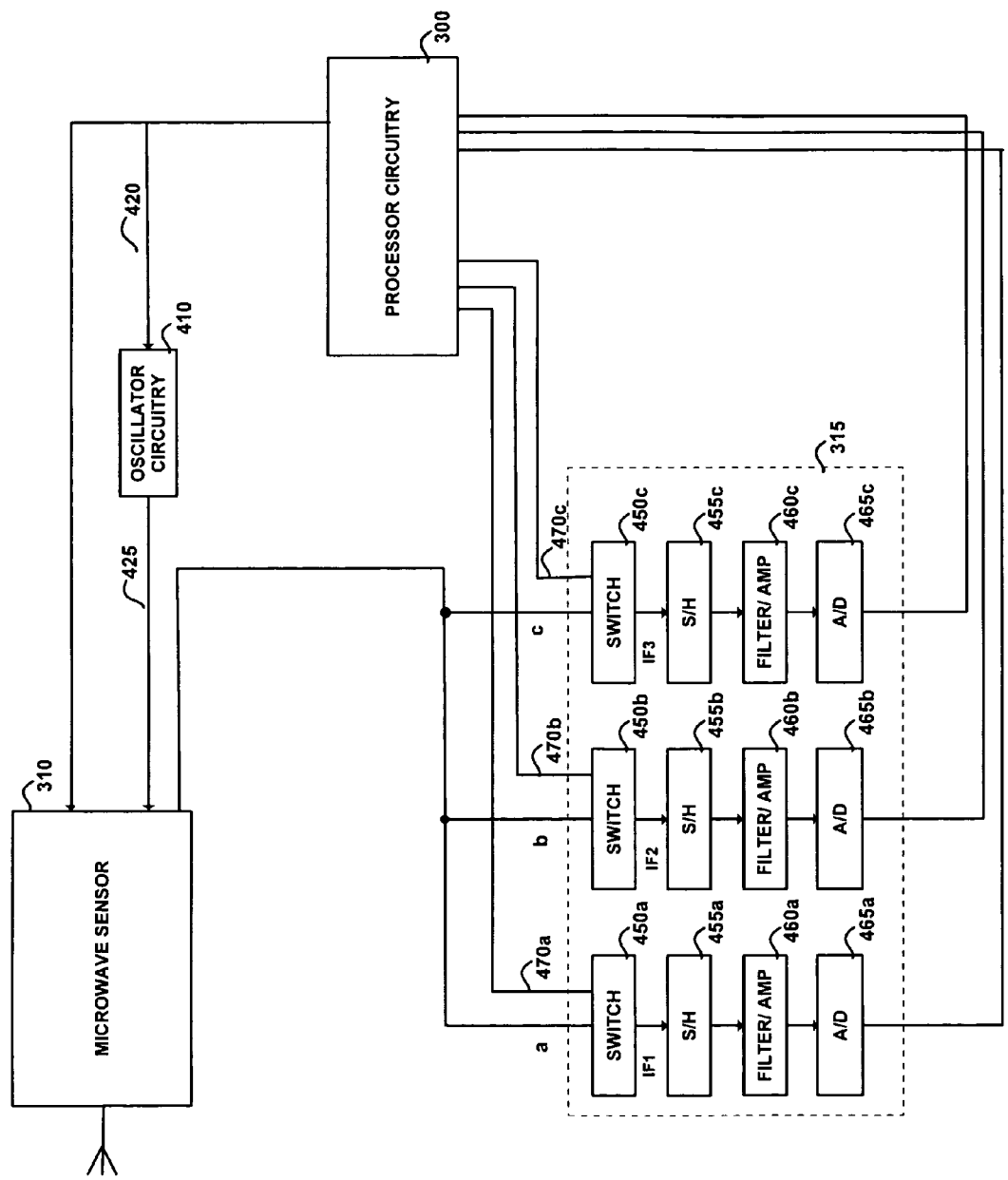
FIG. 9 is a block diagram of the data collection circuits for the microwave detector circuit of FIG. 8 that utilizes three frequencies for determining the target distance.

FIG. 9 shows a block diagram of the data collection circuits 315. In this embodiment the processor circuitry 300 enables the oscillator control circuit 410, which is described in further detail below, to generate a frequency control signal. It is also possible in a different embodiment that the processor circuitry 300 generates the frequency control signal. The frequency control signal causes the microwave sensor 310 to transmit and receive microwave signals at three different frequencies, F1, F2, and F3. The microwave sensor 310 converts the received microwave signals to IF signal component by mixing a portion of the microwave signal (at the transmitted F1, F2, or F3) with the received reflected microwave signal as known in the art. The IF signal components are sequentially transferred to three parallel data channels, a, b, c. The parallel data channels a-c each have a switch 450a-c that is enabled by the processor circuitry 300 to allow the IF signal to be connected to a sample and hold circuit 455a-c. The signal from the sample and hold circuit 455a-c is amplified by a bandpass amplifier 460a-c and converted to a digital sample by an A/D converter 465a-c. The data sample from the A/D converter 465a-c are transferred to the processing circuitry 300. The amplifier circuit can be replaced by an automatic gain control.

Figure 10:
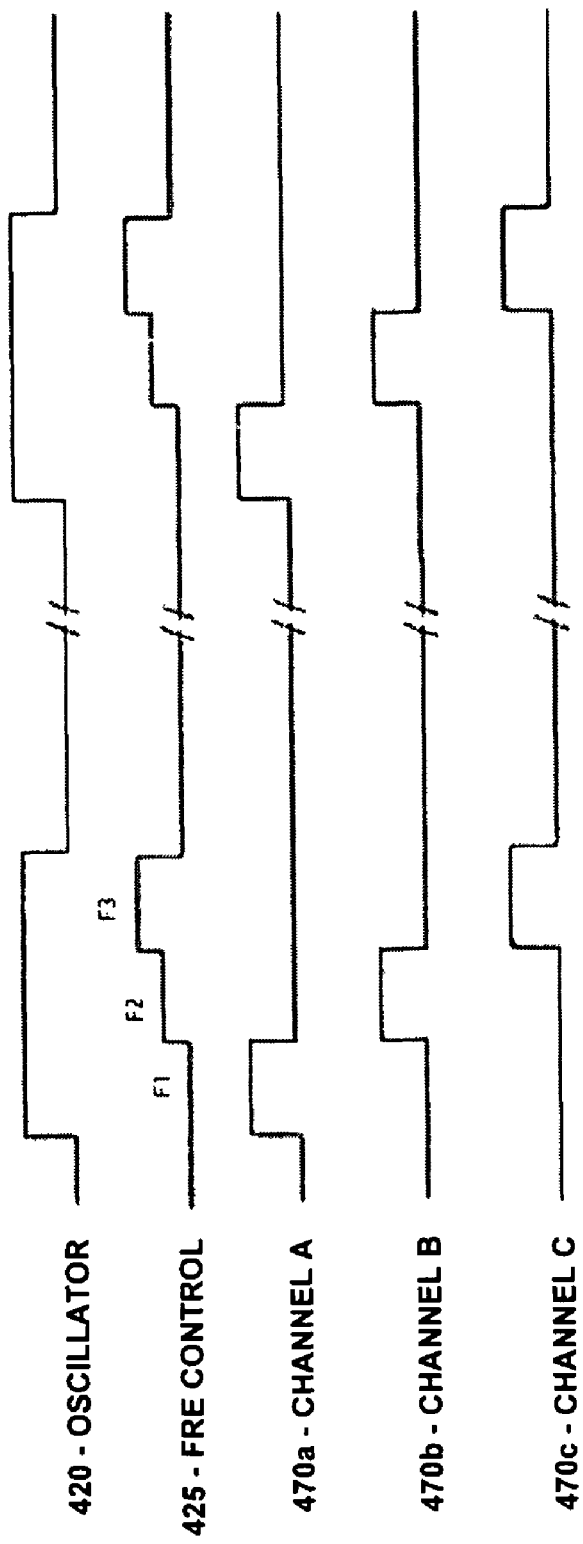
FIG. 10 is a timing diagram showing the control signals for the data collecting circuits of FIG. 9.

FIG. 10 shows a timing diagram of the control signals from the processor circuitry 300. The data collection starts when the oscillator control circuit 410 is enabled by the Oscillator enable signal 420 from the processor circuitry 300. The frequency control signal 425, which is generated by the oscillator control circuit 410, has a variable voltage range. The frequency control signal 425 contains, for example, three voltage steps that correspond to the selected frequencies of F1, F2, and F3. Since F1 is held constant, the voltage corresponding to F1 is always the same. The voltages of F2 and F3 vary depending on the resolution. As shown, the switch enable signals 470a-c for selecting switch 450a, b, and c correspond to the voltage steps for F1, F2, and F3 respectively. These control signals cause data sample collection to proceed in the following manner: the microwave sensor 310 transmits, receives and converts to IF a microwave signal at frequency F1; the IF signal component is transmitted to switch 450a; and the sample-and-hold circuit 455a samples it. While data channel a is amplifying and converting the F1 sample to a digital format, the frequency control signal 425 changes voltage level to correspond to frequency F2. This causes the microwave sensor 310 to transmit, receive and convert to IF a microwave signal at frequency F2. The IF signal component is transmitted to switch 450b and the sample-and hold circuit 455b samples it. While data channel b is amplifying and converting the F2 sample to a digital format, the frequency control signal 425 changes voltage level to correspond to frequency F3. This causes the microwave sensor 310 to transmit, receive and convert to IF a microwave signal at frequency F3. The IF signal component is transmitted to switch 450c and the sample-and hold circuit 455c samples it. Data channel c amplifies and coverts the F3 sample to a digital format while the oscillator enable signal 420 is disabled. The data samples from all three data channels are stored then stored by the processor circuitry 300. This sequence takes place at a periodic rate of, for example, two hundred microseconds. After the data samples are collected for each IF1, IF2, and IF3, the processing described above is performed.

Figure 11:
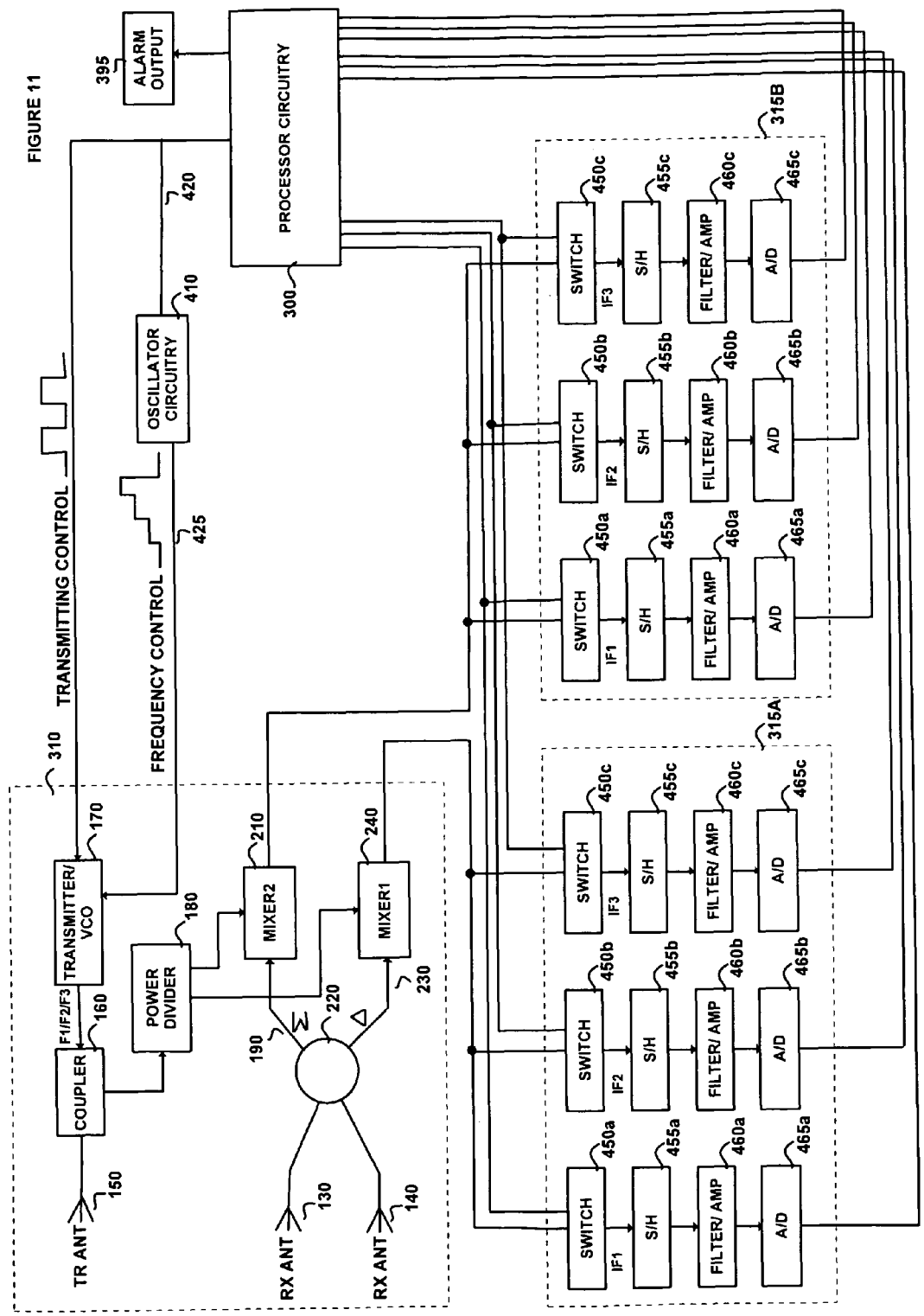
FIG. 11 is a block diagram of the preferred embodiment of the present invention that utilizes the three-frequency target distance measurement circuit in combination with the dual-antenna target angle measurement circuit.

Combination of Target Angle Measurement with Three-Frequency Distance Measurement As stated above, the preferred embodiment of the present invention advantageously utilizes the target angle measurement techniques explained above with the three-frequency distance measurements also explained above. The circuitry implemented to achieve this embodiment in accordance with these combined technologies is shown in FIG. 11, and operates as follows. The processor circuitry 300 enables the oscillator control circuit 410 to generate a frequency control signal. The frequency control signal causes the microwave sensor 310 to transmit microwave signals at three different frequencies, F1, F2, and F3 sequentially. The transmitted microwave frequency signals (F1, F2, and F3) are reflected from a moving target, and then received by each of the two receiving antennas 130 and 140, with each receiving antenna 130, 140 providing a received signal in each of two separate channels. The received reflected microwave frequency signals are summed in one channel and subtracted in the other channel as described above. The IF signal produced by the sum channel contains a sequence of the sums of the two receivers 130 and 140 at the three different frequencies F1, F2, and F3, while the IF signal produced by the difference channel contains a sequence of the differences of the two receivers 130 and 140 at the three different frequencies F1, F2, and F3. As shown in FIG. 11, there are two identical data collection circuits 315A and 315B. The IF signal produced by the difference channel is sampled by data collection circuits 315A as described above (with respect to data collection circuits 315) and the IF signal produced by the sum channel is sampled by data collection 315B, which operates in the same manner as data collection circuits 315A.

The processor circuitry 300 sequentially collects the data samples into six data sets of the IF signal samples where the data sets correspond to a sum data set for each of the three microwave signals (F1, F2, and F3) and a difference data set for each of the three microwave signals (F1, F2, and F3). The processor circuitry 300 can use the sum and difference data sets from any one of the frequencies F1, F2, or F3 to determine the target angle as described above, or it can determine the target angle for all three frequencies and take an average, thereby eliminating errors.

Next, the processor circuitry 300 determines the accurate target distance. Depending on the target angle, the sum channel may have a stronger signal or the difference channel may have a stronger signal. The processor 300 selects the channel with the stronger signal to calculate the accurate target distance as described above. For example, the sum channels will be used if the target angle is less than 30 degree.

Next, using the phase information from the FFT of any one of the sum channel data sets and the corresponding difference channel data sets (same frequency), the phase difference can be determined and used to identify whether the target is located at left or right relative to the sensor. This may be accomplished by simply associating a negative difference with the left side of the detector and a positive difference with the right side of the detector, or visa versa. (This phase difference is between the sum and difference channels, which is different from the phase difference between the different frequencies that is used for target distance determination).

Determination of Location of Target as Function of Distance and Angle

Once the target angle and the target distance have been determined, the process of ascertaining the target location may be done in several ways. In one embodiment, the X,Y Cartesian coordinates may be defined as a function of the angle, the distance, the left or right side. This location may then be compared against a map of the protected region, previously stored in memory. If the location is within the protected region as defined by the stored map, then the processor circuitry 300 generates an alarm message and outputs the alarm message 395 to an associated control panel or the like.

Generation of the coordinate map of the protected region may be accomplished during installation of the detector 102. At installation, the installer may set the detector to a learn mode, such as by depressing a switch as known in the art of security systems. Then, the installer may walk around the perimeter of the room being protected by the detector. The detector will detect the moving installer and calculate his or her locations as he travels around the perimeter. This data will be stored internally in the detector in a memory as a map of the protected area.

In the alternative, the detector may be programmed to store measured target angles and accompanying target distances for each sample set as the installer travels around the perimeter. This stored raw data may then be used as a basis for comparison during operation to ascertain if the detected target is within the protected area.

Optionally, the detector may be configured to recognize that even if the target is detected to be outside the protected area, a warning signal may be sent if certain conditions are met. For example, if the target is approaching the protected region, but has not entered the protected region, then the warning signal may be sent to warn occupants that an intruder may be approaching the house. Other types of patterns and inputs may be used as well, such as time of day, window or door location, and the like. Additionally, the processor circuitry 300 may be programmed by a user to cause an alarm message to be transmitted 395 only when there is a transition from outside the protected area to inside the protected area. This mode would be useful when there are occupants within the protected area, i.e. nighttime mode.

I claim:

1. A method of detecting a target within a predefined protected region with a microwave motion detector, comprising the steps of:

transmitting microwave frequency signals;

receiving the microwave frequency signals reflected by a target;

determining, from the received microwave frequency signals, a target distance;

determining, from the received microwave frequency signals, a target angle;

determining, from the target distance and the target angle, a target location; and setting an alarm condition if the target location is within the predefined protected region; wherein:

the step of transmitting microwave frequency signals comprises transmitting a plurality of microwave frequency signals at different frequencies; and wherein the step of determining, from the received microwave frequency signals, a target distance comprises:
generating from the received microwave signals intermediate frequency signal components, wherein each intermediate frequency signal component is representative of one of the received reflected microwave signals,
sampling the intermediate frequency signal components,
determining phase angles from the sampled intermediate frequency signal components,
determining a phase difference between the phase angles,
determining, from the phase difference, a corresponding target distance measurement.

2. The method of claim 1 wherein three or more microwave frequency signals are transmitted at different frequencies; and wherein:
the step of determining phase angles from the sampled intermediate frequency signal components comprises determining a first, second, and third phase angle from the sampled intermediate frequency signal components;
the step of determining a phase difference between the phase angles comprises determining a first phase difference between the second phase angle and the first phase angle, and determining a second phase difference between the third phase angle and the first phase angle; and
the step of determining, from the phase difference, a corresponding target distance measurement comprises: for each of the first and second phase differences, determining two corresponding distance measurements, wherein one distance measurement is a true distance measurement and the other distance measurement is an ambiguous distance measurement, and selecting an accurate distance measurement by matching the common true distance measurement of each phase difference.

3. The method of claim 1 wherein the intermediate frequency signal components are multiplexed on a single intermediate frequency signal, and wherein the step of sampling of the intermediate frequency signal components comprises the steps of:
collecting data samples of the intermediate frequency signal that corresponds to each of the three transmitted microwave frequency signals comprising the steps of:
enabling one of three data channels by selecting a switch to provide the intermediate frequency signal to the selected data channel, wherein the selected data channel corresponds to one of the three transmitted microwave frequency signals,
sampling and holding the intermediate frequency signal,
amplifying the selected intermediate frequency sample,
converting to digital format the amplified intermediate frequency sample, and
storing the digital intermediate frequency sample,
repeating for a predetermined number of times the step of collecting data samples to form three intermediate frequency data sets.

4. A method of detecting a target within a predefined protected region with a microwave motion detector, comprising the steps of:
transmitting microwave frequency signals;
receiving the microwave frequency signals reflected by a target;
determining, from the received microwave frequency signals, a target distance;
determining, from the received microwave frequency signals, a target angle;
determining, from the target distance and the target angle, a target location; and
setting an alarm condition if the target location is within the predefined protected region; further comprising the steps of:
detecting the location of the target for a plurality of location samples;
analyzing the plurality of location samples to determine if the target has transitioned from a first region to a second region, and
when the target has transitioned from a first region to a second region, initiating a predetermined action.

5. A method of detecting a target within a predefined protected region with a microwave motion detector, comprising the steps of:
transmitting microwave frequency signals;
receiving the microwave frequency signals reflected by a target;
determining, from the received microwave frequency signals, a target distance;
determining, from the received microwave frequency signals, a target angle;
determining, from the target distance and the target angle, a target location; and
setting an alarm condition if the target location is within the predefined protected region; further comprising the steps of setting a warning condition if the target location is not within the predefined protected region.

6. A microwave motion detector for detecting a target within a predefined protected region comprising:
a transmitter transmitting microwave frequency signals;
a receiving antenna, each receiving the microwave signals reflected by a target; and
processing circuitry adapted to:
determine, from the received microwave frequency signals, a target distance
determine, from the received microwave frequency signals, a target angle;
determine, from the target distance and the target angle, a target location and
set an alarm condition if the target location is within a predefined protected region; wherein:
the transmitter transmits a plurality of microwave frequency signals at different frequencies; and wherein
the processing circuitry determines, from the received microwave frequency signals, a target distance by being adapted to:
generate from the received microwave signals intermediate frequency signal components, wherein each intermediate frequency signal component is representative of one of the received reflected microwave signals,
sample the intermediate frequency signal components,
determine phase angles from the sampled intermediate frequency signal components,
determine a phase difference between the phase angles, and
determine, from the phase difference, a corresponding target distance measurement.

7. The microwave motion detector of claim 6 wherein three or more microwave frequency signals are transmitted at different frequencies; and wherein:
the processing circuitry determines the phase angles from the sampled intermediate frequency signal components by being adapted to determine a first, second, and third phase angle from the sampled intermediate frequency signal components;
the processing circuitry determines a phase difference between the phase angles by being adapted to determine a first phase difference between the second phase angle and the first phase angle, and determines a second phase difference between the third phase angle and the first phase angle; and the processing circuitry determines, from the phase difference, a corresponding target distance measurement by being adapted to: for each of the first and second phase differences, determine two corresponding distance measurements, wherein one distance measurement is a true distance measurement and the other distance measurement is an ambiguous distance measurement, and select an accurate distance measurement by matching the common true distance measurement of each phase difference.

8. The microwave motion detector of claim 6 wherein the intermediate frequency signal components are multiplexed on a single intermediate frequency signal, and wherein the processing circuitry is adapted to sample the intermediate frequency signal components by:

collecting data samples of the intermediate frequency signal that corresponds to each of the three transmitted microwave frequency signals comprising by:

enabling one of three data channels by selecting a switch to provide the intermediate frequency signal to the selected data channel, wherein the selected data channel corresponds to one of the three transmitted microwave frequency signals, sampling and holding the intermediate frequency signal, amplifying the selected intermediate frequency sample, converting to digital format the amplified intermediate frequency sample, and storing the digital intermediate frequency sample, repeating for a predetermined number of times the step of collecting data samples to form three intermediate frequency data sets.

9. A microwave motion detector for detecting a target within a predefined protected region comprising:

a transmitter transmitting microwave frequency signals;
a receiving antenna, each receiving the microwave signals reflected by a target; and
processing circuitry adapted to:
  determine, from the received microwave frequency signals, a target distance
  determine, from the received microwave frequency signals, a target angle;
  determine, from the target distance and the target angle, a target location and
set an alarm condition if the target location is within a predefined protected region; wherein the processing circuitry is further adapted to:
  detect the location of the target for a plurality of location samples;
  analyze the plurality of location samples to determine if the target has transitioned from a first region to a second region, and
  when the target has transitioned from a first region to a second region, initiate a predetermined action.

10. A microwave motion detector for detecting a target within a predefined protected region comprising:

a transmitter transmitting microwave frequency signals;
a receiving antenna, each receiving the microwave signals reflected by a target; and
processing circuitry adapted to:
  determine, from the received microwave frequency signals, a target distance
  determine, from the received microwave frequency signals, a target angle;
  determine, from the target distance and the target angle, a target location and
set an alarm condition if the target location is within a predefined protected region; wherein the processing circuitry is further adapted to set a warning condition if the target location is not within the predefined protected region.

* * * * *